(12) United States Patent
Georgeson et al.

(10) Patent No.: US 9,020,767 B2
(45) Date of Patent: Apr. 28, 2015

(54) WIRELESS FUEL MONITORING SYSTEM

(75) Inventors: Gary E. Georgeson, Tacoma, WA (US); Daniel James Kovach, Renton, WA (US); William Joseph Tapia, Kapowsin, WA (US); Andrew M. Robb, Ravensdale, WA (US)

(73) Assignee: The Boeing Company, Chicago, IL (US)

( * ) Notice: Subject to any disclaimer, the term of this patent is extended or adjusted under 35 U.S.C. 154(b) by 697 days.

(21) Appl. No.: 13/301,258

(22) Filed: Nov. 21, 2011

(65) Prior Publication Data
US 2013/0132004 A1    May 23, 2013

(51) Int. Cl.
*G01F 23/296*   (2006.01)
*G01F 23/30*    (2006.01)
*G01F 23/68*    (2006.01)
*G01F 25/00*    (2006.01)
*G01F 23/00*    (2006.01)

(52) U.S. Cl.
CPC ........ *G01F 23/2962* (2013.01); *G01F 25/0069* (2013.01); *G01F 23/0061* (2013.01); *G01F 25/0061* (2013.01); *G01F 23/30* (2013.01); *G01F 23/303* (2013.01); *G01F 23/68* (2013.01)

(58) Field of Classification Search
CPC ... G01F 23/303; G01F 23/2962; G01F 23/68; G01F 23/30; G01F 25/00; G01F 23/00
See application file for complete search history.

(56) References Cited

U.S. PATENT DOCUMENTS

| | | | |
|---|---|---|---|
| 4,353,519 A | 10/1982 | Bogart | |
| 4,437,627 A | 3/1984 | Moorehead | |
| 5,702,081 A | 12/1997 | Gallemore, II | |
| 6,629,457 B1 * | 10/2003 | Keller | 73/290 V |
| 2004/0226362 A1 * | 11/2004 | Marx et al. | 73/290 V |
| 2005/0029419 A1 | 2/2005 | Ware et al. | |

FOREIGN PATENT DOCUMENTS

DE      3204199 A1    8/1983

OTHER PUBLICATIONS

SSI Technologies—Application Note AT-AN4 Acu-Trac Fuel Level Sensor Product Overview; Mar. 19, 2007, pp. 1-9.*
International Search Report and Written Opinion of PCT/US2012/028220 dated Jan. 18, 2013, 20 pgs.
U.S. Appl. No. 13/149,369, filed Jun. 27, 2011.
U.S. Appl. No. 12/970,664, filed Dec. 16, 2010.
U.S. Appl. No. 12/924,287, filed Sep. 23, 2010.
Kaatze, U. et al; Ultrasonic Velocity Measurements in Liquids with High Resolution-Techniques, Selected Applications and Perspectives; Measurement Scient and Technology 19; 2008; IPO Publishing.

(Continued)

*Primary Examiner* — Janet Suglo
*Assistant Examiner* — L. Anderson
(74) *Attorney, Agent, or Firm* — Armstrong Teasdale LLP

(57) ABSTRACT

A monitoring system includes a transducer coupled to an outer surface of a tank wall. The transducer is oriented to transmit a first signal through the tank wall. An intermediate reflective surface is positioned within the fuel storage tank. The intermediate reflective surface is oriented to produce a first reflected signal associated with the first signal. A controller is programmed to calculate a fuel level based on at least the first signal and the first reflected signal.

20 Claims, 4 Drawing Sheets

(56) References Cited

OTHER PUBLICATIONS

Ultrasonic Sensors for Level Measurement; http://www.morganelectroceramics.com; 2009; 2 pages.

SSI Technologies—Application Note for AT-AN4 Acu-Trac™ Fuel Level Sensor Product Overview.

* cited by examiner

WIRELESS FUEL MONITORING SYSTEM

BACKGROUND

The present disclosure relates generally to fuel systems and, more particularly, to methods and systems for use in monitoring a fuel system.

Known fuel monitoring systems include a controller and a sensor positioned inside a fuel storage tank for use in monitoring a fuel parameter, such as fuel quantity. To transfer data between the sensor and the controller, at least some known fuel monitoring systems couple the sensor to the controller via wiring. During operation, at least some wiring may be exposed to high current impulses as a result of equipment failure and/or a lightning strike, for example. Such high current impulses may lead to sparking within the fuel storage tank, which, given the proximity to flammable vapors and/or fuel, could lead to catastrophic results. As such, at least some known fuel monitoring systems include lightning protection systems that are designed to prevent possible fuel ignition sources. However, known lightning protection systems are often cumbersome and/or are expensive to implement and/or maintain. Moreover, at least some known lightning protection systems are not inherently fault-tolerant.

BRIEF SUMMARY

In one aspect, a method is provided for use in monitoring a fuel system including a fuel storage tank having a tank wall. The method includes transmitting a first signal through the tank wall. A first reflected signal associated with the first signal is received, and a fuel level is calculated based on at least the first signal and the first reflected signal.

In another aspect, a controller is provided for use in monitoring a fuel system including a fuel storage tank having a tank wall. The controller includes a memory device and a processor coupled to the memory device. The controller is programmed to transmit a first signal through the tank wall. A first reflected signal associated with the first signal is produced within the fuel storage tank, and a fuel level is calculated based on at least the first signal and the first reflected signal.

In yet another aspect, a monitoring system is provided for use with a fuel storage tank including a tank wall. The monitoring system includes a transducer coupled to an outer surface of the tank wall. The transducer is oriented to transmit a first signal through the tank wall. A primary reflective surface is positioned generally at a fuel level within the fuel storage tank. The primary reflective surface is oriented to produce a first reflected signal associated with the first signal. A controller is programmed to calculate a fuel level based on at least the first signal and the first reflected signal.

The features, functions, and advantages described herein may be achieved independently in various embodiments of the present disclosure or may be combined in yet other embodiments, further details of which may be seen with reference to the following description and drawings.

Although specific features of various embodiments may be shown in some drawings and not in others, this is for convenience only. Any feature of any drawing may be referenced and/or claimed in combination with any feature of any other drawing.

DETAILED DESCRIPTION

The subject matter described herein relates generally to fuel systems and, more particularly, to methods and systems for use in monitoring a fuel system. In one embodiment, a monitoring system is provided that includes a transducer that is coupled to an outer surface of the tank wall. The transducer transmits a first signal, and receives a reflected signal. In such an embodiment, a parameter of the fuel system, such as fuel quantity, may be determined based on the signals. The subject matter described herein enables monitoring a fuel system using a transducer that is positioned external to a fuel storage tank. As such, the subject matter described herein facilitates reducing the need to penetrate and/or transmit power through a tank wall of the fuel system.

An exemplary technical effect of the methods and systems described herein includes at least one of: (a) transmitting a first signal through a tank wall; (b) determining an amount of elapsed time between a transmission of the first signal and a reception of a first reflected signal associated with the first signal; (c) calculating a fuel level based on at least the first signal and the first reflected signal; and (d) transmitting a second signal through the tank wall; (e) determining an amount of elapsed time between a transmission of the second signal and a reception of a second reflected signal associated with the second signal; and (f) determining a fuel temperature based on at least the transmitted signal and the second reflected signal.

An element or step recited in the singular and proceeded with the word "a" or "an" should be understood as not excluding plural elements or steps unless such exclusion is explicitly recited. Moreover, references to "one embodiment" of the present invention and/or the "exemplary embodiment" are not intended to be interpreted as excluding the existence of additional embodiments that also incorporate the recited features.

Figure 1:
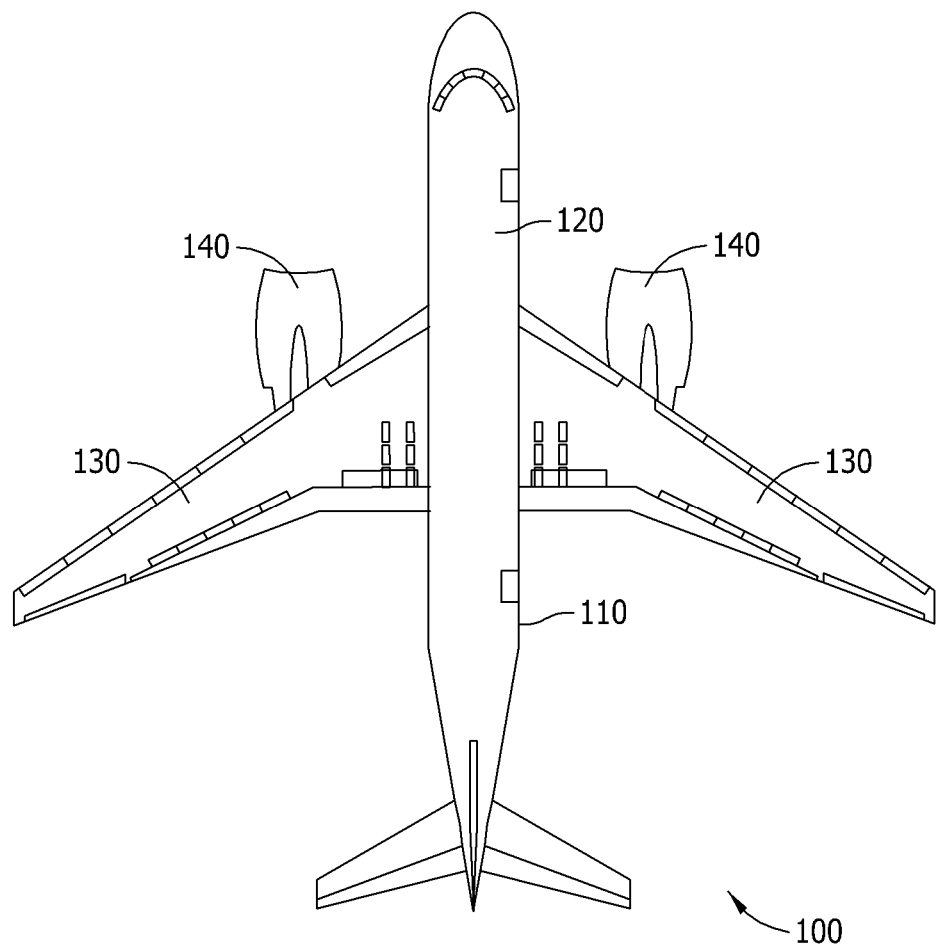
FIG. 1 is a plan view of an exemplary aircraft.

FIG. 1 is a plan view of an exemplary aircraft 100. In the exemplary embodiment, aircraft 100 includes a body 110 that includes a fuselage 120 and a pair of wings 130 extending from fuselage 120. In the exemplary embodiment, at least one engine 140 is coupled to each wing 130 to provide thrust to aircraft 100. Aircraft 100 may include any number of engines 140 that enables aircraft 100 to function as described herein. In the exemplary embodiment, each wing 130 includes at least one fuel system (not shown) that provides fuel at least to its respective engine 140.

Figure 2:
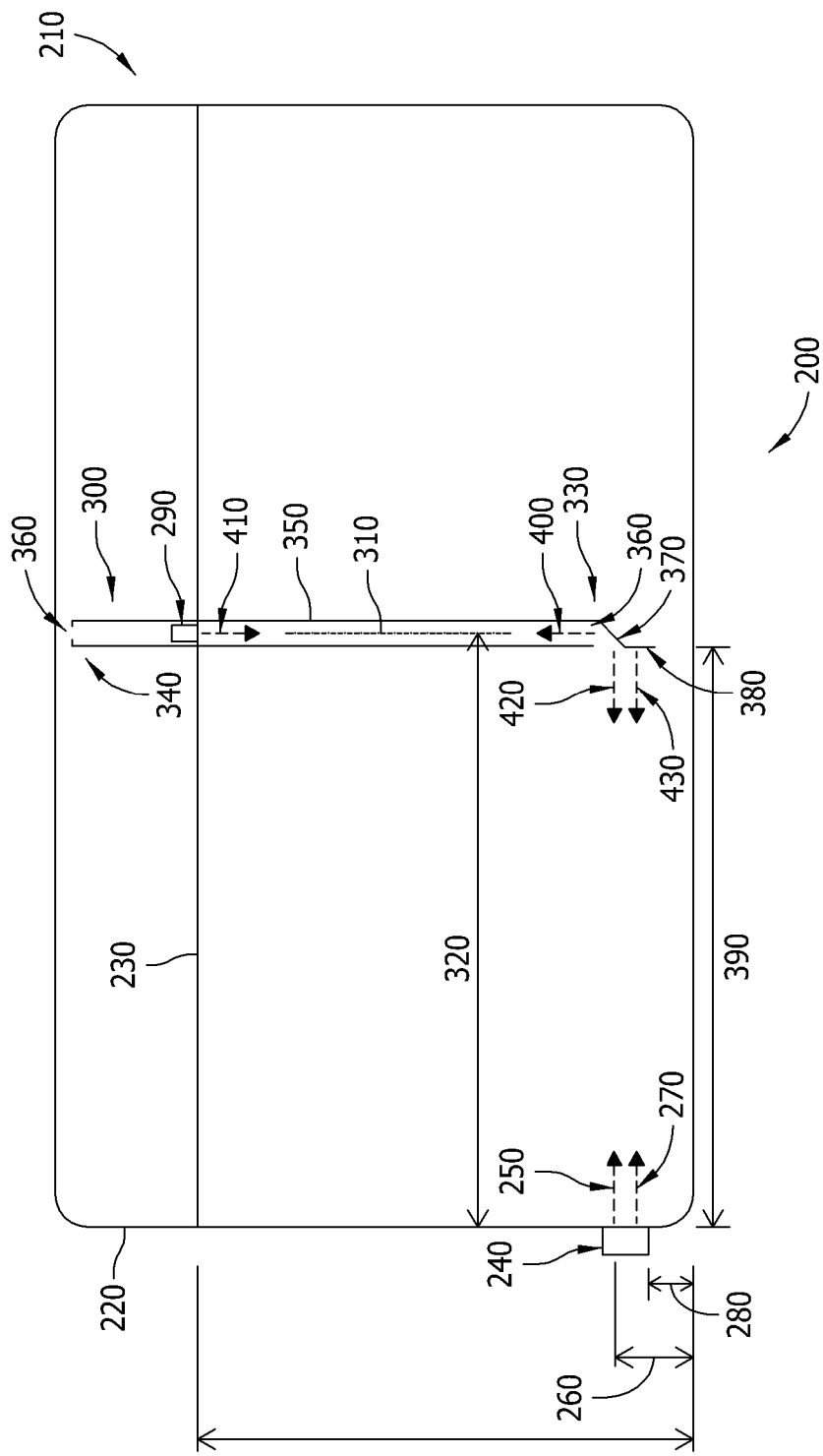
FIG. 2 is a schematic illustration of an exemplary fuel monitoring system that may be used with the aircraft shown in FIG. 1.

FIG. 2 is a schematic view of an exemplary fuel monitoring system 200 that may be used to monitor the fuel system of aircraft 100. In the exemplary embodiment, the fuel system includes a fuel storage tank 210 defined by an external tank wall 220. In the exemplary embodiment, fuel storage tank 210 is sized to contain fuel therein having various fuel parameters including a fuel level 230, a fuel type, a fuel density, and a fuel temperature.

In the exemplary embodiment, a transducer 240 is coupled to an outer surface of tank wall 220 such that transducer 240 remains external to and is positioned outside of fuel storage tank 210. In the exemplary embodiment, transducer 240 is oriented to transmit at least one signal into fuel storage tank 210 and to receive at least one signal reflected from within fuel storage tank 210. In the exemplary embodiment, the signal is in the ultrasonic range. Alternatively, the signal may have any wavelength and/or frequency that enables fuel monitoring system 200 to function as described herein. In the exemplary embodiment, transducer 240 is configured to transmit a first signal 250 at a first predetermined distance from a lower surface or at a predetermined first height 260 of fuel storage tank 210 and transmit a second signal 270 at a second predetermined distance from the lower surface or at a predetermined second height 280 of fuel storage tank 210. In the exemplary embodiment, second height 280 is different than first height 260. Alternatively, transducer 240 may transmit and/or receive any number of signals at any height that enables fuel monitoring system 200 to function as described herein.

In the exemplary embodiment, a floating plug 290 is positioned within fuel storage tank 210 and is suitably buoyant such that it is generally positioned at fuel level 230. As such, in the exemplary embodiment, the position of floating plug 290 is dynamic and changes depending on an amount of fuel stored in fuel storage tank 210. In the exemplary embodiment, floating plug 290 is fabricated with a primary reflective surface (not shown) that is substantially planar and that is oriented to be substantially parallel with a lower surface of fuel storage tank 210 when floating plug 290 is floating within fuel storage tank 210. As such, in the exemplary embodiment, a signal projected towards the reflective surface of floating plug 290 in an upward direction reflects a signal in a direction that is substantially opposite the projected signal (e.g., in a downward direction). Alternatively, the reflective surface of floating plug 290 may be oriented at any angle that enables fuel monitoring system 200 to function as described herein.

In the exemplary embodiment, floating plug 290 is positioned within a control tube 300 that has a center axis 310 that is substantially parallel to tank wall 220 and that is a predetermined distance 320 from an inner surface of tank wall 220. Moreover, in the exemplary embodiment, a plurality of retaining mechanisms (not shown) couple control tube 300 to tank wall 220 to facilitate maintaining the predetermined position of control tube 300 relative to tank wall 220. Alternatively, control tube 300 may be maintained in any position and/or orientation that enables fuel monitoring system 200 to function as described herein.

In the exemplary embodiment, control tube 300 is substantially cylindrical and includes a bottom end 330, a top end 340, and a tube wall 350 extending therebetween. In the exemplary embodiment, control tube 300 is sized and/or shaped to enable a relative position and/or orientation of floating plug 290 to be generally maintained within control tube 300. More specifically, in the exemplary embodiment, tube wall 350 facilitates horizontally retaining floating plug 290 within control tube 300 such that floating plug 290 is movable generally along center axis 310 of control tube 300. As such, in the exemplary embodiment, tube wall 350 facilitates reducing measurement variations that could occur due to fuel sloshing.

Moreover, in the exemplary embodiment, bottom end 330 and/or top end 340 is sized and/or shaped to retain floating plug 290 within control tube 300. More specifically, in the exemplary embodiment, bottom end 330 and/or top end 340 includes an opening 360 having a diameter that is smaller than a width of floating plug 290 such that floating plug 290 is retained within control tube 300. In the exemplary embodiment, opening 360 is sized and/or shaped to enable fuel to flow into and out of control tube 300 such that fuel level 230 is approximately the same internally within and externally to control tube 300. Alternatively, control tube 300 may have any shape and/or configuration that enables fuel monitoring system 200 to function as described herein.

In the exemplary embodiment, at least one intermediate reflective surface 370 is positioned within fuel storage tank 210. More specifically, in the exemplary embodiment, intermediate reflective surface 370 is positioned at first height 260 and at predetermined distance 320 from an inner surface of tank wall 220. As such, in the exemplary embodiment, intermediate reflective surface 370 is generally aligned vertically with transducer 240 (i.e., at the same height as transducer 240) and generally aligned horizontally with control tube 300 (i.e., at the same distance from tank wall 220 as control tube 300). In the exemplary embodiment, intermediate reflective surface 370 is coupled to bottom end 330 of control tube 300. Alternatively, any number of intermediate reflective surfaces 370 may be positioned anywhere within fuel storage tank 210 that enables fuel monitoring system 200 to function as described herein.

In the exemplary embodiment, intermediate reflective surface 370 is substantially planar and is oriented at approximately a 45° angle with respect to tank wall 220, tube wall 350, and/or the reflective surface of floating plug 290. As such, in the exemplary embodiment, a signal projected substantially horizontally towards intermediate reflective surface 370 reflects a signal in a direction that is substantially vertical, and a signal projected substantially vertically towards intermediate reflective surface 370 reflects a signal in a direction that is substantially horizontal. Alternatively, intermediate reflective surface 370 may be oriented at any angle that enables fuel monitoring system 200 to function as described herein.

In the exemplary embodiment, at least one secondary reflective surface 380 is positioned within fuel storage tank 210. More specifically, in the exemplary embodiment, secondary reflective surface 380 is positioned at second height 280 and at a predetermined distance 390 from an inner surface of tank wall 220. As such, in the exemplary embodiment, secondary reflective surface 380 is generally aligned vertically with transducer 240 (i.e., at the same height as transducer 240) such that secondary reflective surface 380 would not obstruct first signal 250 projected towards intermediate reflective surface 370. Alternatively, secondary reflective surface 380 may be positioned anywhere within fuel storage tank 210 that enables fuel monitoring system 200 to function as described herein.

In the exemplary embodiment, secondary reflective surface 380 is substantially planar and is oriented to be substantially parallel with tank wall 220. As such, in the exemplary embodiment, a signal projected substantially horizontally towards secondary reflective surface 380 reflects a signal in a direction that is substantially opposite the projected signal. Alternatively, secondary reflective surface 380 may be oriented at any angle that enables fuel monitoring system 200 to function as described herein.

In one embodiment, second height 280 is approximately the same as first height 260. In such an embodiment, secondary reflective surface 380 is selectively reflective such that first signal 250 having a first frequency and/or first wavelength generally passes through secondary reflective surface 380 and towards intermediate reflective surface 370, such that second signal 270 having a second frequency and/or second wavelength that is different than the first frequency and/or first wavelength reflects off of secondary reflective surface 380. In at least some embodiments, an adjusting mechanism (not shown) may be used to selectively adjust a relative position of transducer 240, control tube 300, intermediate reflective surface 370, and/or secondary reflective surface 380.

During operation, in the exemplary embodiment, transducer 240 transmits first signal 250 substantially horizontally towards intermediate reflective surface 370. In the exemplary embodiment, first signal 250 is reflected off of intermediate reflective surface 370 to produce a first reflected signal 400 that is associated with first signal 250. In the exemplary embodiment, intermediate reflective surface 370 projects signal 400 substantially upwardly towards the reflective surface of floating plug 290 to produce a second reflected signal 410 that is associated with signal 250 and/or 400. In the exemplary embodiment, the reflective surface of floating plug 290 projects signal 410 substantially downwardly towards intermediate reflective surface 370 to produce a third reflected signal 420 that is associated with signal 250, 400, and/or 410. In the exemplary embodiment, intermediate reflective surface 370 projects signal 420 substantially horizontally towards transducer 240. In the exemplary embodiment, transducer 240 receives reflected signal 420 to enable fuel level 230 to be calculated based on at least first signal 250 and reflected signal 420, as described in more detail below.

Moreover, in the exemplary embodiment, transducer 240 transmits second signal 270 substantially horizontally towards secondary reflective surface 380. In the exemplary embodiment, second signal 270 is reflected off of secondary reflective surface 380 to produce a reflected signal 430 that is associated with second signal 270. In the exemplary embodiment, secondary reflective surface 380 projects signal 430 substantially horizontally in the opposite direction towards transducer 240. In the exemplary embodiment, transducer 240 uses reflected signal 430 to determine a signal velocity R and/or a fuel temperature based on at least second signal 270 and reflected signal 430, as described in more detail below.

Figure 3:
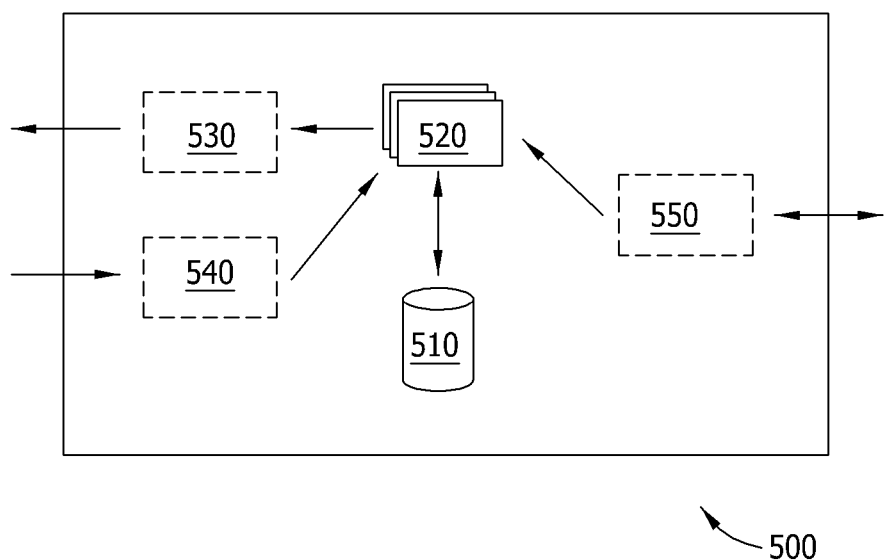
FIG. 3 is a schematic illustration of an exemplary controller that may be used with the fuel monitoring system shown in FIG. 2.

FIG. 3 is a schematic illustration of an exemplary controller 500 that may be used to operate fuel monitoring system 200. In the exemplary embodiment, controller 500 includes a memory device 510 and a processor 520 coupled to memory device 510 for use in executing instructions. More specifically, in the exemplary embodiment, controller 500 is configurable to perform one or more operations described herein by programming memory device 510 and/or processor 520. For example, processor 520 may be programmed by encoding an operation as one or more executable instructions and by providing the executable instructions in memory device 510.

Processor 520 may include one or more processing units (e.g., in a multi-core configuration). As used herein, the term "processor" is not limited to integrated circuits referred to in the art as a computer, but rather broadly refers to a controller, a microcontroller, a microcomputer, a programmable logic controller (PLC), an application specific integrated circuit, and other programmable circuits.

In the exemplary embodiment, memory device 510 includes one or more devices (not shown) that enable information such as executable instructions and/or other data to be selectively stored and retrieved. In the exemplary embodiment, such data may include, but is not limited to, fuel type data, temperature-density curves, temperature look-up tables, calibration curves, operational data, and/or control algorithms. Memory device 510 may also include one or more computer readable media, such as, without limitation, dynamic random access memory (DRAM), static random access memory (SRAM), a solid state disk, and/or a hard disk.

In the exemplary embodiment, controller 500 includes a presentation interface 530 that is coupled to processor 520 for use in presenting information to a user. For example, presentation interface 530 may include a display adapter (not shown) that may couple to a display device (not shown), such as, without limitation, a cathode ray tube (CRT), a liquid crystal display (LCD), a light-emitting diode (LED) display, an organic LED (OLED) display, an "electronic ink" display, and/or a printer. In some embodiments, presentation interface 530 includes one or more display devices.

Controller 500, in the exemplary embodiment, includes an input interface 540 for receiving input from the user. For example, in the exemplary embodiment, input interface 540 receives information suitable for use with the methods described herein. Input interface 540 is coupled to processor 520 and may include, for example, a joystick, a keyboard, a pointing device, a mouse, a stylus, a touch sensitive panel (e.g., a touch pad or a touch screen), and/or a position detector. It should be noted that a single component, for example, a touch screen, may function as both presentation interface 530 and as input interface 540.

In the exemplary embodiment, controller 500 includes a communication interface 550 that is coupled to processor 520. In the exemplary embodiment, communication interface 550 communicates with at least one remote device, such as transducer 240. For example, communication interface 550 may use, without limitation, a wired network adapter, a wireless network adapter, and/or a mobile telecommunications adapter. A network (not shown) used to couple controller 500 to the remote device may include, without limitation, the Internet, a local area network (LAN), a wide area network (WAN), a wireless LAN (WLAN), a mesh network, and/or a virtual private network (VPN) or other suitable communication means.

For example, in the exemplary embodiment, controller 500 may transmit to and/or receive signals from transducer 240 related to, without limitation, a transmission time, a detection time, a signal wavelength, a signal frequency, operational data, and/or control algorithms. In the exemplary embodiment, transducer 240 communicates with controller 500 to facilitate monitoring fuel storage tank 210. Moreover, in the exemplary embodiment, controller 500 communicates with transducer 240 to calculate and/or determine a fuel temperature, a fuel density, and/or a fuel level. In at least some embodiments, transducer signals may be high-pass filtered, band-pass filtered, and/or low-pass filtered during the fuel monitoring process to facilitate eliminating stray acoustic signals that could potentially interfere with signal measurements from aircraft 100 and/or the environment.

Figure 4:
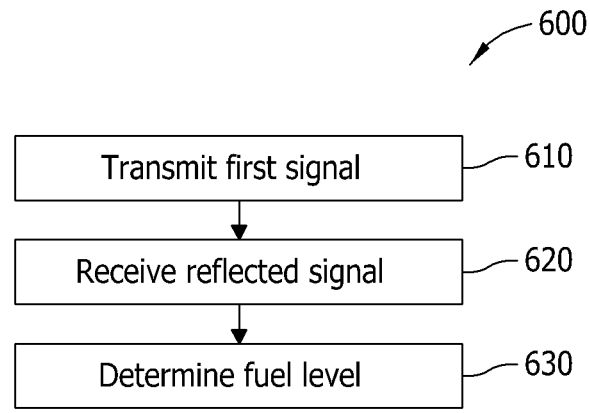
FIGS. 4 and 5 are flowcharts of exemplary methods that may be used to monitor a fuel system.

FIG. 4 is a flowchart of an exemplary method 600 that may be implemented by controller 500 to monitor a fuel system. In the exemplary embodiment, controller 500 is programmed to transmit 610 first signal 250 from transducer 240. In the exemplary embodiment, reflected signal 420 is received 620 at transducer 240 to enable fuel level 230 to be calculated and/or determined 630 based on at least first signal 250 and reflected signal 420. More specifically, in the exemplary embodiment, fuel level 230 is determined 630 based on a first time period $T_1$ (i.e., an amount of elapsed time) between the transmission of first signal 250 and the reception of reflected signal 420, given a thickness of tank wall 220, first height 260, predetermined distance 320, and a signal velocity R. That is, in the exemplary embodiment, first time period $T_1$ is representative of a total distance traveled by signals 250, 400, 410, and 420, and fuel level 230 may be calculated using the following equation:

$$F = \frac{T_1 \times R}{2} - W + D_1 - D_2 \quad \text{(Eq. 1)}$$

wherein F is a height of fuel level 230, $T_1$ is the time between the transmission of first signal 250 and the reception of reflected signal 420, R is the signal velocity, W is the thickness of tank wall 220, $D_1$ is first height 260, and $D_2$ is predetermined distance 320.

In one embodiment, transducer 240 is generally aligned horizontally with the reflective surface of floating plug 290 such that first signal 250 is transmitted 610 substantially vertically towards the reflective surface of floating plug 290. In such an embodiment, first signal 250 is reflected off of the reflective surface of floating plug 290 to produce reflected signal 420 that is associated with first signal 250. In such an embodiment, the reflective surface of floating plug 290 projects signal 420 substantially vertically in the opposite direction towards transducer 240.

In such an embodiment, reflected signal 420 is received 620 at transducer 240 to enable fuel level 230 to be calculated and/or determined 630 based on at least first signal 250 and reflected signal 420. More specifically, in such an embodiment, fuel level 230 is determined 630 based on a second time period $T_2$ (i.e., an amount of elapsed time) between the transmission of first signal 250 and the reception of reflected signal 420, given a thickness of tank wall 220 and a signal velocity R. That is, in the exemplary embodiment, second time period $T_2$ is representative of a total distance traveled by signals 250 and 420, and fuel level 230 may be calculated using the following equation:

$$F = \frac{T_2 \times R}{2} - W \quad \text{(Eq. 2)}$$

wherein F is a height of fuel level 230, $T_2$ is the time between the transmission of first signal 250 and the reception of reflected signal 420, R is the signal velocity, and W is the thickness of tank wall 220.

Figure 5:
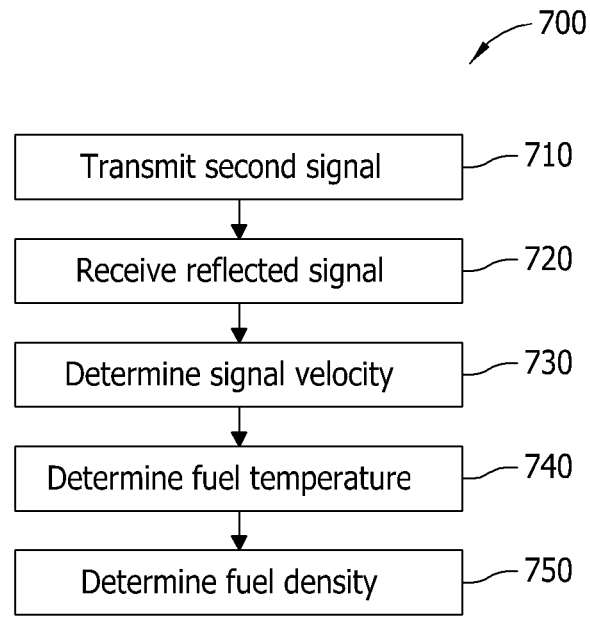

FIG. 5 is a flowchart of an exemplary method 700 that may be implemented by controller 500 to monitor the fuel system. In the exemplary embodiment, controller 500 is further programmed to transmit 710 second signal 270 from transducer 240 to facilitate increasing an accuracy of determination 630. In one embodiment, first and second signals 610 and 710 may be simultaneously transmitted. In the exemplary embodiment, reflected signal 430 is received 720 at transducer 240 to enable signal velocity R to be determined 730 based on at least second signal 270 and reflected signal 430. More specifically, in the exemplary embodiment, signal velocity R is determined 730 based on a third time period $T_3$ (i.e., an amount of elapsed time) between the transmission of second signal 270 and the reception of reflected signal 430, given a thickness of tank wall 220 and predetermined distance 390. That is, in the exemplary embodiment, third time period $T_3$ is representative of a total distance traveled by signals 410 and 420, and signal velocity R may be determined using the following equation:

$$R = \frac{2(W + D_3)}{T_3} \quad \text{(Eq. 3)}$$

wherein R is the signal velocity, W is the thickness of tank wall 220, $D_3$ is predetermined distance 390, and $T_3$ is the time between the transmission of second signal 270 and the reception of reflected signal 430. In at least some embodiments, a first signal velocity $V_1$ may be determined for the signal velocity through tank wall 220, and a second signal velocity $V_2$ may be determined for the signal velocity through the fuel within fuel storage tank 210 based on at least material used to fabricate tank wall 220 and/or a fuel type.

In the exemplary embodiment, controller 500 is further programmed to determine 740 a fuel temperature based on at least signal velocity R, given the fuel type. For example, the fuel temperature is determined 740 based on a temperature look-up table and/or a calibration curve of signal velocities versus fuel temperatures for the type of fuel within fuel storage tank 210. Moreover, controller 500 is further configured to determine 750 a fuel density based on at least the fuel temperature, given the fuel type. For example, the fuel density is determined 750 based on a density look-up table and/or a calibration curve of fuel temperatures versus fuel densities for the type of fuel within fuel storage tank 210. Such look-up tables and/or calibration curves may be predetermined, for example, based on test measurements using fuel monitoring system 200.

The embodiments described herein relate generally to fuel systems and, more particularly, to methods and systems for use in monitoring a fuel system. The embodiments described herein reduce a need to penetrate and/or transmit power through a fuel storage tank wall. For example, most, if not all, of the power systems (e.g., the transducer and the controller) are external to the fuel storage tank, and there are few, if any, conductive paths within the tank for lightning strikes. As such, the embodiments described herein provide protective features that facilitate keeping an ignition source, such as sparking, from flammable fuel vapors. Moreover, the modular nature of the embodiments described herein enables each component of the fuel monitoring system to be adjusted, repaired, and/or replaced independent of the other components. As such, the embodiments described herein facilitate reducing installation costs and/or maintenance costs.

Exemplary embodiments of methods and systems for monitoring a fuel system are described above in detail. The methods and systems are not limited to the specific embodiments described herein, but rather, components of systems and/or steps of the method may be utilized independently and separately from other components and/or steps described herein. Each method step and each component may also be used in combination with other method steps and/or components. Although specific features of various embodiments may be shown in some drawings and not in others, this is for convenience only. Any feature of a drawing may be referenced and/or claimed in combination with any feature of any other drawing.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method for use in monitoring a fuel system including a fuel storage tank having a tank wall, a tank top, and a tank bottom, said method comprising:
   transmitting, by a transducer, a first signal through the tank wall and into a control tube positioned within the fuel storage tank, the control tube having a top end and a bottom end extending between the tank top and the tank bottom;
   receiving, by the transducer, a first reflected signal associated with the first signal, wherein at least one of the first signal and the first reflected signal are reflected off of at least one intermediate reflective surface positioned between the tank bottom and the bottom end of the control tube; and
   calculating, by a controller coupled to the transducer, a fuel level based on at least the first signal and the first reflected signal.

2. A method in accordance with claim 1, wherein calculating a fuel level further comprises determining an amount of elapsed time between a transmission of the first signal and a reception of the first reflected signal.

3. A method in accordance with claim 1 further comprising reflecting the first signal off of a reflective surface positioned within the fuel storage tank.

4. A method in accordance with claim 1 further comprising reflecting the first reflected signal off of a reflective surface positioned within the fuel storage tank.

5. A method in accordance with claim 1 further comprising:
   transmitting a second signal through the tank wall;
   receiving a second reflected signal associated with the second signal; and
   determining a fuel temperature based on at least the second signal and the second reflected signal.

6. A method in accordance with claim 5, wherein determining a fuel temperature further comprises determining an amount of elapsed time between a transmission of the second signal and a reception of the second reflected signal.

7. A controller for use in monitoring a fuel system including a fuel storage tank having a tank wall, a tank top, and a tank bottom, said controller comprising a memory device and a processor coupled to said memory device, said controller programmed to:
   transmit a first signal through the tank wall and into a control tube positioned within the fuel storage tank, the control tube having a top end and a bottom end extending between the tank top and the tank bottom, wherein a first reflected signal associated with the first signal is produced within the fuel storage tank, wherein at least one of the first signal and the first reflected signal are reflected off of at least one intermediate reflective surface positioned between the tank bottom and the bottom end of the control tube; and
   calculate a fuel level based on at least the first signal and the first reflected signal.

8. A controller in accordance with claim 7, wherein said controller is further programmed to determine an amount of elapsed time between a transmission of the first signal and a reception of the first reflected signal.

9. A controller in accordance with claim 7, wherein said controller is further programmed to:
   transmit a second signal through the tank wall, wherein a second reflected signal associated with the second signal is produced within the fuel storage tank; and
   determine a fuel temperature based on at least the second signal and the second reflected signal.

10. A controller in accordance with claim 9, wherein said controller is further programmed to determine an amount of elapsed time between a transmission of the second signal and a reception of the second reflected signal.

11. A controller in accordance with claim 7 further comprising a band-pass filter that facilitates reducing an effect of undesired acoustic signals.

12. A monitoring system for use with a fuel storage tank including a tank wall, a tank top, and a tank bottom, said monitoring system comprising:
   a transducer coupled to an outer surface of the tank wall, said transducer oriented to transmit a first signal through the tank wall;
   a control tube positioned within the fuel storage tank, said control tube comprising a top end and a bottom end extending between the tank top and the tank bottom;
   a primary reflective surface positioned generally at a fuel level within the fuel storage tank, said primary reflective surface oriented to produce a first reflected signal associated with the first signal;
   at least one intermediate reflective surface positioned between the tank bottom and said bottom end of said control tube; and
   a controller programmed to calculate a fuel level based on at least the first signal and the first reflected signal.

13. A monitoring system in accordance with claim 12, wherein said controller is further programmed to determine an amount of elapsed time between a transmission of the first signal and a reception of the first reflected signal.

14. A monitoring system in accordance with claim 12, wherein said at least one intermediate reflective surface is oriented to reflect at least one of the first signal and the first reflected signal.

15. A monitoring system in accordance with claim 14, wherein said at least one intermediate reflective surface is oriented to reflect the first reflected signal and produce a second reflected signal associated with the first reflected signal, wherein said controller is further programmed to determine an amount of elapsed time between a transmission of the first signal and a reception of the second reflected signal.

16. A monitoring system in accordance with claim 12 further comprising a secondary reflective surface positioned within the fuel storage tank, wherein said transducer is oriented to transmit a second signal through the tank wall, said secondary reflective surface oriented to produce a second reflected signal associated with the second signal, said controller further programmed to determine a fuel temperature based on at least the second signal and the second reflected signal.

17. A monitoring system in accordance with claim 16, wherein said controller is further programmed to determine an amount of elapsed time between a transmission of the second signal and a reception of the second reflected signal.

18. A monitoring system in accordance with claim 12, wherein said controller further comprises a band-pass filter that facilitates reducing an effect of undesired acoustic signals.

19. A monitoring system in accordance with claim 12 further comprising a floating plug coupled to said primary reflective surface.

20. A monitoring system in accordance with claim 19, wherein said floating plug is positioned within said control tube.

* * * * *